United States Patent Office 3,794,608
Patented Feb. 26, 1974

---

3,794,608
AQUEOUS COATING COMPOSITIONS THICKENED BY A TERPOLYMER OF AN ALKENYL AROMATIC COMPOUND, AN UNSATURATED DICARBOXYLIC ACID, AND AN ETHER OF VINYL BENZYL ALCOHOL AND AN OXYALKYLATED COMPOUND
Syamalarao Evani, Robert H. Lalk, and Terry H. Fiero, Midland, Mich., assignors to The Dow Chemical Company, Midland, Mich.
No Drawing. Continuation-in-part of abandoned application Ser. No. 267,569, June 29, 1972. This application May 11, 1973, Ser. No. 359,371
Int. Cl. C08f 41/02, 47/18
U.S. Cl. 260—29.6 RW
33 Claims

ABSTRACT OF THE DISCLOSURE

Water soluble and alkali soluble interpolymers such as styrene/maleic anhydride/nonylphenoxy (ethyleneoxy)$_{40}$ vinyl benzyl ether provide improved stability and flow and leveling properties to aqueous coating compositions containing an emulsified water insoluble vinyl addition polymer as the essential film forming component.

---

Thi application is a continuation-in-part of our co-pending application, Ser. No. 267,569, filed on June 29, 1972, now abandoned.

BACKGROUND OF THE INVENTION

Aqueous emulsions of water insoluble film forming vinyl addition polymers, frequently referred to as latex coatings or latex paints, especially when pigmented, are quite fluid in character. For ease of application, better coverage and brushability, many different types of water soluble thickeners such as casein, cellulosics and the like have been used in formulating such products. However, the presently known thickening agents do not necessarily, and usually do not, provide other desirable properties such as flow and leveling, color acceptance, film build and the like. Certain ester salts of anhydride polymers as described in U.S. 3,301,829 have been found to additionally provide good flow and leveling properties. However, the viscosity of latex paints thickened with said ester salts is not stable on storage in some formulated systems.

What is desired is a thickening agent which will provide stable viscosities under storage conditions and also provide good flow and leveling properties, color acceptance and other desirable properties.

SUMMARY OF THE INVENTION

The above benefits and advantages have been unexpectedly obtained by using a water or alkali soluble interpolymer of about 0.25 to 12.5 mole percent of a vinyl benzyl ether monomer, 25 to 99.75 mole percent of an anionic or nonionic hydrophilic monomer and the balance to make 100 percent of a hydrophobic monomer as the thickening agent for aqueous coating compositions containing an emulsified, water insoluble vinyl addition polymer as the essential film-forming component.

The particular vinyl benzyl ether monomers have the formula

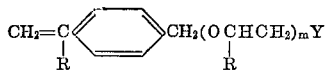

wherein R is hydrogen or methyl, m is about 10 to 100 and Y is

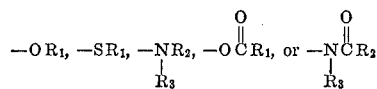

where $R_1$ is an alkyl, aralkyl or alkaryl hydrophobic group of 10 to about 22 carbon atoms, $R_2$ is an alkyl group of 1 to about 22 carbon atoms and $R_3$ is hydrogen or an alkyl group of 1 to about 22 carbon atoms, provided $R_2$ and $R_3$ in combination have at least 10 carbon atoms.

DESCRIPTION OF THE INVENTION

Many water soluble polymers may be a thickening agent, but invariably such polymers have one or more disadvantages which limit their utility. Casein provides good flow and leveling in latex paints but the efficiency of thickening is poor, the paint films are water sensitive and casein is readily subject to bacterial attack. Cellulosics in contrast, can provide good thickening but flow and leveling properties are deficient. Many cellulosics are also subject to bacterial degradation. U.S. 3,301,829 describes certain ester polymers which have poor viscosity stability. U.S. 3,499,876 describes a general purpose class of thickening agents but the number of possible polymeric materials is limited to only certain monomers and there is no basis therein to judge their value in providing properties of the kind sought herein.

This invention provides numerous advantages and benefits by the addition of a single polymeric material. Principal advantages include good thickening efficiency, stable viscosity upon storage and good flow and leveling properties in latex paints and like coatings. Additional advantages include good color acceptance, scrub resistance, film build and the like.

Important to the interpolymer is the vinyl benzyl ether monomer having the formula

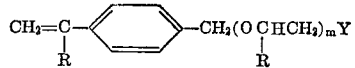

where R, m and Y are as previously defined. The number of oxyalkylene units

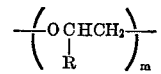

should be at least 10, preferably 20–40, and may be as high as 100. Preferably, also, said units are oxyethylene units, although mixtures of oxyethylene and oxypropylene (heteric or block) units may be present.

The nature of the linking groups between the oxyalkylene chain and the hydrophobic group are not considered significant, since they are all hydrophilic groups. The linking group is more dependent merely on the reactants employed to provide the hydrophobic group. An ethoxylated fatty acid introduces the

group, an ethoxylated nonyl phenol or fatty alcohol the —O— group, an ethoxylated mercaptan the —S— group, an ethoxylated fatty amide the

group or an ethoxylated fatty amine the

group.

$R_1$ may be an alkyl, aralkyl or alkaryl hydrophobic group having from 10 to 22 carbon atoms. Typical $R_1$ groups include lauryl, myristyl, cetyl, stearyl, oleyl, linoleyl, 2-phenyl decyl, octyl phenyl, decyl phenyl, dodecyl phenyl and the like. $R_2$ groups include methyl, ethyl, butyl and the like as well as alkyl groups defined above for $R_1$. $R_3$ is hydrogen or any of the $R_2$ alkyl groups, provided $R_2$ and $R_3$ in combination have at least 10 carbon atoms.

The monomers are generally prepared by reacting vinyl benzyl chloride (or bromide) with a nonionic surfactant such as ethoxylated nonylphenol. Various hydrophobic groups such as alkyl phenols, fatty acids, fatty alcohols, fatty amines, fatty amides and the like are readily condensed with ethylene oxide, propylene oxides or mixtures thereof to prepare such surfactants. Consequently, many of said surfactants are commercially available. Nonionic surfactants of the above type and their preparation are fully described in "Nonionic Surfactants," vol. 1, edited by M. J. Schick, published by Marcel Decker, Inc., New York, 1967.

The interpolymers are prepared from about 0.25 to 12.5 mole percent of the previously described vinyl benzyl ether monomer, 25 to 99.75 mole percent of an anionic or nonionic hydrophilic monomer and the balance to make 100 percent of a hydrophobic monomer. Preferably the hydrophilic monomer comprises about 25 to 90 mole percent. More preferably the interpolymer comprises about 0.5 to 10 mole percent vinyl benzyl ether, 40 to 80 mole percent hydrophilic monomer and the balance said hydrophobic monomer. While a hydrophobic monomer is optional, its presence as a component of the interpolymer is preferred to obtain the best possible combination of properties.

By hydrophilic monomer it is meant any monomer having a water solubilizing anionic or nonionic group and which in the form of a homopolymer is water soluble or alkali soluble. Anionic groups include carboxyl, anhydride, sulfite, sulfonate and the like. Nonionic groups include hydroxyl, amide and the like. It is to be understood that the invention contemplates monomers such as vinyl esters and vinyl nitriles since said monomers may be hydrolyzed, after polymerization, to provide hydroxyl, amide or carboxylate groups. The monomers may contain more than one of the water solubilizing groups.

Water solubilizing monomers include unsaturated monocarboxylic acids such as acrylic acid, methacrylic acid and the like; sodium styrene sulfonate, sulfoethyl methacrylate

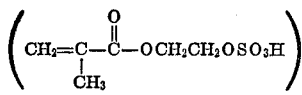

hydroxyalkyl acrylates and methacrylates wherein the alkyl group preferably has from 2–4 carbon atoms but may have more; unsaturated dicarboxylic acids and their anhydrides or half amides such as maleic anhydride, itaconic anhydride, citraconic anhydride, chloromaleic anhydride, fumaric acid, maleic acid, itaconic acid, maleamic acid and the like or lower alkyl half esters or half amides of said acids; amide monomers such as acrylamide; and the like. Mixtures of hydrophilic monomers may be used.

By hydrophobic it is meant any copolymerizable monomer which in the form of a homopolymer is water insoluble. Copolymerizable hydrophobic monomers which may be optionally used include alkenyl aromatic monomers, α-olefins, alkyl diesters of unsaturated dicarboxylic acids, vinyl ethers, vinyl esters, alkyl esters of acrylic and methacrylic acid and the like. Typical of such monomers are styrene, α-methyl styrene, vinyl toluene, ethylene, propylene, vinyl butyl ether, vinyl hexyl ether, vinyl acetate, vinyl benzoate, ethyl acrylate, methyl methacrylate, cyclohexyl acrylate, 2-ethyl hexyl methacrylate, diethyl maleate, dibutyl fumarate and the like. Mixtures of hydrophobic monomers may be used.

The preparation of the interpolymer may be accomplished by known polymerization techniques such as mass, solution, emulsion or suspension polymerization methods. Solution polymerization involves the use of a solvent for the monomers and the interpolymer. Both emulsion and suspension polymerization involve the use of a non-solvent for one or more of the monomers and the interpolymer. Emulsion polymerization produces a stable polymer latex of small particle size whereas the polymer particle produced by the suspension method is comparatively large in size.

While not limited thereto, the interpolymers of the present invention are preferably prepared by a solution polymerization method. In said method the monomers are dissolved in a suitable solvent (benzene, toluene, methyl ethyl ketone, acetone, chlorinated aliphatics, alcohols and the like) and polymerized by heating in the presence of a free radical yielding catalyst such as peroxides, persulfates, azo compounds and the like. Interpolymers prepared in this manner have a more uniform composition.

Typical interpolymers with said vinyl benzyl ether monomer (VBE) include:

styrene/methacrylic acid/maleic anhydride/VBE
methyl methacrylate/acrylic acid/VBE
isobutylene/maleic anhydride/VBE
styrene/isobutylene/maleic anhydride/VBE
styrene/maleic anhydride/itaconic acid/VBE
styrene/maleic anhydride/methacrylic acid/VBE.

A particularly useful group of interpolymers are prepared from alkenyl aromatic monomers, unsaturated dicarboxylic acids or their anhydrides and said vinyl benzyl ether. The mole ratio of said monomers may vary from 0.75/1/0.25 to 2.99/1/0.01, respectively. Preferably the unsaturated dicarboxylic acid or anhydride comprises about 50 mole percent. The interpolymer preferably is a copolymer of styrene/maleic anhydride/VBE.

The molecular weight of the polymer influences the thickening efficiency of the interpolymer and may range from about 4,000 up to about a million, preferably about 30,000 to 600,000. This corresponds, for example, to a viscosity of about 2 to 20 cps. (measured as a 10% by weight solution in methyl ethyl ketone at 25° C.) for the above interpolymer.

When the polymer contains carboxyl (—COOH), —$SO_2H$ or —$SO_3H$ groups they can be water solubilized by neutralizing the polymer with any suitable inorganic or organic base such as amines, ammonia, alkali metal bases (e.g., sodium or potassium hydroxide, carbonate, etc.) and the like. The interpolymer may be slurried in water and then neutralized to solubilize it. When the polymer contains an anhydride group it is readily hydrolyzed to the diacid form and neutralized. The anhydride group may also be half esterified with an alcohol and then neutralized or may be directly reacted with ammonia or amines to form the half amide salt. It is meant to include the half ester and half amide salts as interpolymer water solubilizing salt groups.

The coating is understood to include an aqueous emulsion or dispersion of a water insoluble, film-forming vinyl addition polymer together with any added water, solvents, emulsifiers, surfactants and the like employed in its preparation. The vinyl addition polymer solids content may vary widely but most commercially available latexes contain from about 45 to 55 weight percent polymer solids.

Film-forming polymers suitable for formulating latex paints are commercially available from numerous manufacturers. While a great diversity of water insoluble vinyl addition polymer emulsions may be prepared, the invention is especially well suited with the three major classes of latexes, i.e., the "acrylics," the "styrene copolymers" and the "vinyl esters," although the invention is not limited thereto.

By "acrylics" it is meant to include copolymers composed of the esters of acrylic and methacrylic acid such as methyl, ethyl, propyl, butyl, 2-ethylhexyl, cyclohexyl, dodecyl and the like esters. Minor amounts of a variety of other monomers may be employed for specific purposes. It is possible also to include smaller amounts of monomers such as acrylic acid, methacrylic acid, itaconic acid, hydroxyalkyl acrylates and methacrylates and the like provided the amount employed is insufficient to impart water solubility. The presence of the latter monomers frequently imparts better dispersibility and stability to the latex among other advantages and purposes.

"Styrene copolymers" refer to the class of latexes which are composed of copolymers of styrene with comonomer such as esters of acrylic and methacrylic acids and the conjugated diolefins such as butadiene, isoprene, chloroprene and the like. Copolymers of styrene and butadiene in varying proportions are particularly well known. Styrene can be replaced in part or totally by vinyl aromatic monomers such as vinyl toluene, $\alpha$-methyl styrene, chloro substituted styrene, alkyl substituted styrenes and the like. In addition, varying amounts of other monomers may also be employed such as itaconic acid, acrylonitrile, methacrylonitrile, acrylic acid, methacrylic acid and the like. Monomers containing water solubilizing groups may be employed in small amounts provided the amount is insufficient to impart water solubility.

A third well known class of latexes, called "vinyl esters," is typified by vinyl ester polymers and copolymers of which the best known is polyvinyl acetate. Other monomers of this class include vinyl propionate, vinyl benzoate, vinyl stearate and the like. Copolymers of vinyl esters and $\alpha$-olefins such as ethylene are also well known. Minor amounts of other monomers may also be employed such as a copolymer of vinyl acetate and small amounts of acrylic or methacrylic acid.

The above description of latexes is not meant to be all inclusive but only descriptive of the many kinds of water insoluble, film-forming vinyl addition polymer latexes which may be prepared. The latexes are conveniently and generally prepared by emulsion polymerization methods which are well known and fully described in the art. It is not considered necessary to detail herein such preparative methods since the invention relates to latex coatings and not to the preparation of the latex itself.

Coatings may be formulated without any added pigments. However, pigments are usually employed and in this invention may be used up to a pigment volume concentration of about 65 percent. Pigment volume concentration (PVC) is a commonly understood term to the latex paint formulator and is defined as the volume ratio of pigment per the combined volume of the pigment plus the volume of the film-forming polymer solids. The ratio will vary depending on the type of coating being formulated.

Pigments of all kinds are well known to the art. Briefly, pigments include white opacifying pigments such as titanium dioxide (rutile or blends of rutile and anatase), zinc oxide, lithopone and the like; extender pigments such as kaolin clay, calcium carbonate, talc, mica, barium sulfate, silica, or calcium or magnesium silicates; color pigments (inorganic, metal organic and organic types) including chrome yellows, Prussian blues, Brunswick greens, zinc sulfide and the like; and modifying pigments such as attapulgite clay, bentonite clay, hydrophobic clays, diatomaceous silicas, colloidal silicas or silicates and the like. Generally, excess phosphate dispersants used with the pigments will detract from thickening efficiency but have not been critical to performance of the invention at normal levels of use of 0.05–0.1% concentration.

The finished latex coating should contain about 45 to 55 weight percent of total solids. The total solids may range up to about 65 percent, but preferably is between about 50 and 55 percent. The upper limit is usually a practical limit imposed by the physical characteristics of the binder emulsion or dispersion.

The amount of the interpolymer added for thickening and for flow and leveling ranges between about 0.25 to 2.5 weight percent based on the total wet weight of the latex paint but the amount added should be sufficient to provide the finished latex coating with a viscosity of about 80 to 140 KU (Kreb units). This viscosity is routinely measured by means of a Stormer viscometer which is well known to the art. By water soluble or alkali soluble it is meant the interpolymers should be soluble to the above extent.

Other additives commonly employed may be present in the coating formulation such as dispersants, preservatives, coalescing agents, glycols, stabilizers and the like. Such additives do not appear to be critical in their normal range of use. Further improvements in flow, leveling and film build properties may be obtained by adding about 0.5 to 1% of ethoxylated (9–15 moles) alkyl phenol surfactants.

The following tests were employed to evaluate the coating compositions and coatings thereof.

Viscosity.—Coating viscosity is measured in Kreb units by means of a Stormer viscometer with a calibrated Krebs spindle.

Coating sag.—Using an anti-sag meter and 7B sag test chart (Leneta Co.), 10 parallel stripes ¼ inch wide and ⅟₁₆ inch apart which vary in thickness from 3 mils to 12 mils are laid down by a doctor blade on a test panel. The panel is then placed in a vertical position such that the stripes are horizontal and the 3 mil stripe at the top. After the stripes have dried, the anti-sag index is assigned to the stripe which has not sagged sufficiently to touch the next lower stripe. Complete sagging is indicated by a rating of 3 and no sagging by a rating of 12.

Color acceptance.—A colorant (1 gm.) is mixed with 49 gms. of pigmented latex paint and uniformly blended in a 2 oz. glass bottle. A 10 mil film is then spread and after 15–20 seconds a portion of the film is rubbed with a finger in a circular motion. Any change in color upon rubbing indicates incomplete dispersion (poor acceptance). A darkening in color indicates flocculation of the colorant. A lightening of the color indicates pigment flocculation. A rating of 1 shows no color change (good color acceptance) and a rating of 10 indicates maximum color change.

Film build and brush drag.—Using a 2" nylon brush, paint is applied to a 1' x 2' area on a vertical sealed surface. Film build is rated as excellent, good, moderate or low in accordance with how well a liberal film can be applied without cut-through by the brush. Weight of can and brush is taken before and after brushing, noting the amount of paint applied in grams. During application the resistance to brushing (brush drag) is noted as high, moderate or low.

Leveling.—An 8½" x 11" area is taken from the center of the above panel and visually rated for removal of brush marks (leveling) with a rating of 1 being poor leveling and 10 being excellent leveling.

Scrubbability.—A 10 mil film is cast on a black scrub panel and dried at 72° F. for 24 hours. The panel is placed on a straight line washability and abrasion tester (Gardner Labs), 10 gms. of ASTM scrub media applied to the brush and 5 gms. of water applied to the panel. The number of cycles is noted until one complete failure is seen across the width of the film. Media and water are applied after each 400 cycles.

Stability.—Original viscosity is determined, as above. A one-half pint can of paint is sealed and stored at 120° F. At one week intervals up to 4 weeks, the can is removed and allowed to cool. It is then opened noting the physical appearance and the viscosity measured.

The following nonlimiting examples will further illustrate the invention. Unless otherwise specified, all parts and percentages are by weight.

EXAMPLE 1

Preparation of a vinyl benzyl ether monomer

Into a nitrogen purged stainless steel kettle was charged 1512 gms. (0.727 mole) of an ethylene oxide condensation product of nonyl phenol having an average value for $m$ of about 40 (nonyl phenol/40 EO), 2415 gms. of t-butyl alcohol as a solvent and 16.4 gms. of sodium metal (0.715 mole). The contents of the kettle were heated at 100° C. for 2 hours while the pressure rose from 0 to 50 p.s.i.g. and then leveled off. After cooling to room temperature, 107 gms. of vinyl benzyl chloride (0.702 mole) was added, the kettle purged with nitrogen and the contents heated at 50–65° C. After 3¾ hours a base titration showed 94% conversion to the vinyl benzyl ether monomer. The contents were allowed to react for an additional 2 hours at 50–55° C. and then neutralized to pH 6–7 with 2.85 gms. of 95% acetic acid.

The alcohol solvent was removed by distillation until the kettle temperature was 80° C. and the pressure 20 mm. Hg. One gallon of benzene was added and then 1 quart distilled off to remove traces of alcohol. The slurry was filtered at 175 mm. Hg and 50° C. to remove NaCl and sodium acetate salts. The remaining benzene was removed by distillation at 80° C. and 20 mm. Hg. The waxy solid product had a melting point of 35–40° C. and weighed 1530 gms. Bromide/bromate titration in methanol gave an equivalent weight of 2180 gms./mole of unsaturation.

A preferred solvent is t-butyl alcohol because it results in good reaction rates and yields. The reaction should be maintained below about 65° C. to prevent polymerization in the strongly basic medium. Since the salts are partially soluble in the alcohol, it is replaced by benzene prior to filtration. The salts are undesirable because they are detrimental to polymerization. Benzene is a preferred recovery solvent because it dissolves the product, does not dissolve the salts and is low boiling and readily removed.

Following the procedure of Example 1, vinyl benzyl ether monomers were prepared in which R was hydrogen, Y was —OR$_1$ and R$_1$ and $m$ were as follows.

| $R_1$: | $m$ |
|---|---|
| n-Decyl | 40 |
| n-Dodecyl | 40 |
| n-Octadecyl | 7 |
| Do | 20 |
| Do | 40 |
| Nonyl phenol | 10 |

EXAMPLE 2

In a 500 ml. flask equipped with mechanical agitation, a condenser, thermometer, N$_2$ inlet tube an external heating bath was added 100 ml. of toluene, 9.8 gms. (0.1 mole) maleic anhydride and 11.3 gms. (0.005 mole) of vinyl benzyl ether of nonyl phenol/40 EO (eq. wt. per double bond, 2260). The mixture was stirred to form a clear solution. Then 9.88 gms. (0.095 mole) of styrene and 0.0098 of azobisisobutyronitrile catalyst added. The polymerization was conducted at 90° C. for three hours. Onset of polymerization was indicated by an initial slight development of turbidity at 88° C. The resulting product was a slightly viscous translucent dispersion. The mixture was cooled and devolatilized under vacuum at 80° C. to remove the solvent. Polymer product yield was 31.58 gms. The polymer had an inherent viscosity in acetone at 25° C. of 0.41 and a 10% solution viscosity in methyl ethyl ketone (MEK) at 25° C. of 6.36 cps.

A 5% sodium salt solution of the polymer was made by dispersing it in water and neutralizing with NaOH (1.75 moles NaOH/mole of anhydride). The clear solution had a Brookfield viscosity of 7700 cps. (#5 spindle, 20 r.p.m., 25° C.). Similar polymers may be prepared in the same manner as above employing any of the vinyl benzyl ether monomers of Example 1. The toluene solvent may also be replaced by other solvents such as methyl ethyl ketone.

The interpolymers of this invention may be conveniently prepared, as previously illustrated, or by any of the other methods well known to polymer chemists. Aromatic solvents, chlorinated aromatic and aliphatic solvents, tetrahydrofuran, dimethyl formamide, dimethyl sulfoxide, ketone solvents and the like may be used. Any convenient concentration of monomers in the solvents may be used such as 10 to 60 weight percent but generally a concentration of about 20 to 40 percent is used. The temperature may also vary considerably, but normally is about 40 to 110° C. Lower temperatures generally produce higher molecular weights and vice versa. The polymerization may be run under pressure but in most instances is not necessary. Catalyst concentrations usually range from about 0.001 to 2 weight percent based on the monomers. An inert atmosphere such as N$_2$, CO$_2$ and the like is usually employed in the polymerization. Peroxide and other free radical generating catalysts are conveniently used.

EXAMPLE 3

Four stock paint formulations were prepared for testing the efficiency of thickeners, property improvements and stability.

(A) Styrene-butadiene (SB) formulation

| Pigment grind: | Lbs./100 gallons |
|---|---|
| Water | 115 |
| Dispersant (Tamol 731) | 8 |
| Titanium dioxide | 190 |
| CaCO$_3$ | 250 |
| Preservative (Dowicil 100) | 2 |
| Silicone defoamer | 2 |
| Paint let down: | |
| Water | 75 |
| Defoamer (Hodag PV–108) | 4 |
| SB latex [1] | 262 |

[1] 67% styrene; 33% butadiene; 55% solids.

(B) Acrylic latex formulation

| Pigment grind: | Lbs./100 gallons |
|---|---|
| Water | 125 |
| Dispersant (Tamol 731) | 8 |
| Polypropylene glycol (1200 M.W.) | 8 |
| Preservative (Dowicil 100) | 2 |
| Titanium dioxide | 200 |
| CaCO$_3$ | 257 |
| Ethylene glycol | 15 |
| Octylphenoxy polyethoxyethanol (Triton X–100) | 5 |
| Paint let down: | |
| Acrylic latex [1] | 387 |

[1] Rhoplex AC–35; 46% solids.

(C) Acrylic semi-gloss formulation

| Pigment grind: | Lbs./100 gallons |
|---|---|
| Water | 73 |
| Propylene glycol | 32 |
| Dispersant (Tamol 731) | 11 |
| Defoamer (Nopco NDW) | 2 |
| Titanium dioxide | 275 |
| Paint let down: | |
| Preservative (Dowicil 100) | 1.25 |
| Water | 20 |
| Propylene glycol | 32 |
| Coalescing agent (Dalpad A) | 10 |
| Defoamer (Nopco NDW) | 4 |
| Dioctyl sodium sulfosuccinate (Triton GR7) | 2 |
| Sodium salt dodecylated sulfonated diphenyl oxide | 2 |
| Acrylic latex [1] | 590.5 |

[1] Rhoplex AC–490; 46.5% solids.

(D) Polyvinyl acetate formulation

| Pigment grind: | Lbs./100 gallons |
|---|---|
| Water | 200 |
| Dispersant (Tamol 731) | 8 |
| Preservative (Dowicil 100) | 1.25 |
| Ethylene glycol | 25 |
| Titanium dioxide | 250 |
| $CaCO_3$ | 100 |
| Kaolin clay (ASP 400) | 125 |
| Paint let down: | |
| Polyvinyl acetate latex [1] | 250 |
| Defoamer (Nopco NDW) | 2 |

[1] Everflex E; 51% solids.

Various thickeners were added to each of the stock paint formulations in amounts between about 4 to 8 lbs. of active thickener per 100 gallons of total finished paint.

The paint was thoroughly mixed and kept overnight before evaluating its properties.

Thickeners used were a hydroxypropyl methyl cellulose, a thickener of this invention prepared similarly to Example 2 as a sodium salt of a styrene-maleic anhydride-vinyl benzyl ether of nonyl phenol/40 EO, and an ester thickener (prior art) prepared by dissolving an equal molar styrene-maleic anhydride copolymer (SMA), 8 cps., and about 5 mole percent (based on anhydride) of a nonyl phenol 40 mole ethylene oxide condensate in methyl ethyl ketone and heating at 80° C. for 2 hours. The solvent was then removed and the SMA ester dissolved by dispersing it in water and neutralizing with NaOH. The results are tabulated below.

sodium salts were employed. The styrene (S), maleic anhydride (MA), vinyl benzyl ether (VBE) polymers had the following composition.

| Polymer: | Mole ratio |
|---|---|
| (A) S/MA/VBE of nonyl phenol-40 EO | 0.96/1/0.04 |
| (B) S/MA/VBE of nonyl phenol-40 EO | 0.9/1/0.1 |
| (C) S/MA/VBE of nonyl phenol-40 EO | 0.98/1/0.02 |
| (D) S/MA/VBE of nonyl phenol-40 EO | 0.984/1/0.016 |
| (E) S/MA/VBE of dodecanol-40 EO | 0.95/1/0.05 |
| (F) S/MA/VBE of octadecanol-40 EO | 0.95/1/0.05 |

| Paint type | Thickener | Lbs./100 gal. | Viscosity, K.U. | Film build | Flow and leveling | Anti-sag index | Color acceptance |
|---|---|---|---|---|---|---|---|
| Acrylic | A | 4 | 106 | Good | 9 | 10 | 1 |
| Do | B | 3 | 125 | Poor | 7 | 12 | 4 |
| Do | E | 6 | 100 | Fair | 9 | 10 | 1 |
| Do | F | 6 | 105 | Moderate | 9 | 8 | 1 |
| Acrylic semi-gloss | C | 6 | 112 | Good | 9 | 12 | 1 |
| Do | D | 6 | 110 | do | 9 | 12 | 1 |
| Polyvinyl acetate | F | 6 | 88 | Low | 6+ | 11 | |
| Do | B | 8 | 85 | Good | 8+ | 10 | |

EXAMPLE 5

Additional vinylbenzyl ether monomers may be prepared according to Example 1 from the following non-ionic surfactants.

(A) Dodecylphenoxy (ethyleneoxy)$_{14}$ ethanol
(B) Tridecyloxy (ethyleneoxy)$_{14}$ ethanol
(C) Stearyloxy (ethyleneoxy)$_{19}$ ethanol
(D) Lauryloxy (ethyleneoxy)$_{19}$ ethanol
(E) Dodecylmercapto (ethyleneoxy)$_9$ ethanol
(F) t-Alkyl($C_{18}$–$C_{22}$)amino (ethyleneoxy)$_{24}$ ethanol
(G) Dialkylamino (ethyleneoxy)$_{40}$ ethanol
(H) N-methylstearamido (ethyleneoxy)$_{40}$ ethanol
(I) N-ethyllauramido (ethyleneoxy)$_{30}$ ethanol

| Latex paint base and thickener type | Lbs./100 gal. | Paint viscosity, K.U. | Flow and leveling rating | Anti-sag index | Brush drag | Color acceptance [1] | Viscosity after heat aging at 120° F., weeks-K.U. | | | |
|---|---|---|---|---|---|---|---|---|---|---|
| | | | | | | | 1st | 2d | 3d | 4th |
| Acrylic: | | | | | | | | | | |
| Cellulosic | 4 | 80 | 3 | 12 | Fair | 8 | 82 | 80 | 81 | 82 |
| SMA ester | 4 | 106 | 9 | 12 | Good | 1 | 102 | 90 | 84 | 86 |
| Ether polymer [2] | 4 | 105 | 9 | 10 | do | 1 | 109 | 108 | 107 | 107 |
| Semigloss, acrylic: | | | | | | | | | | |
| Cellulosic | 3 | 82 | 8 | 12 | do | 8 | 80 | 79 | 79 | 79 |
| SMA ester | 3 | 90 | 8–9 | 12 | do | 1 | 84 | 80 | 79 | 78 |
| Ether polymer [3] | 5 | 86 | 7 | 12 | do | 1 | 86 | 83 | 84 | 83 |
| Polyvinyl acetate: | | | | | | | | | | |
| Cellulosic | 5 | 85 | 6 | 12 | Fair | 8 | 85 | 85 | 83 | 82 |
| SMA ester | 8 | 97 | 7–9 | | Good | 1 | 97 | 83 | 74 | 69 |
| Ether polymer [2] | 8 | 82 | 9 | 8 | do | 1 | 86 | 84 | 82 | 78 |
| S/B: | | | | | | | | | | |
| Cellulosic | 6 | 98 | 3–4 | 12 | Poor | 8 | 100 | 99 | 98 | 97 |
| SMA ester | 4 | 97 | 6–7 | 12 | Good | 1 | 103 | 102 | 102 | 102 |
| Ether polymer [3] | 4 | 90 | 7–8 | 12 | do | 1 | 101 | 106 | 106 | 107 |

[1] Aquablack G colorant.
[2] Mole ratio of styrene/maleic anhydride/vinyl benzyl ether of 0.95/1/0.05, respectively.
[3] Mole ratio as in (a) of 0.98/1/0.02, respectively.

It can be seen that the latex paint compositions employing the vinyl benzyl ether interpolymer of this invention consistently have good flow and leveling, stable viscosity and good properties with respect to brush drag, sagging and the like. The prior art thickeners do not show the above combination of properties.

The ether thickener in the above tests may be replaced by interpolymers prepared from any of the monomers prepared in Example 1 within the claimed proportions.

EXAMPLE 4

The results of thickening the previous latex paint formulations with various additional interpolymers according to this invention is shown below. In all cases the (J) Octadecylmercapto (ethyleneoxy)$_{60}$ ethanol
(K) N-methyl-N-dodecylamino (ethyleneoxy)$_{40}$ ethanol
(L) Oleyloxy (ethyleneoxy)$_{35}$ ethanol
(M) N,N-dioctyl amino (ethyleneoxy)$_{25}$ ethanol
(N) Hexadecylmercapto (ethyleneoxy)$_{45}$ ethanol Additional polymers may be prepared from the above monomers according to the previous examples which are useful in this invention.

EXAMPLE 6

An interpolymer was made from 22.5 gms. (24 mole percent) styrene, 58.1 gms. (75 mole percent) methacrylic acid and 19.4 gms. (1 mole percent) vinyl benzyl ether of nonyl phenol/40 EO in 200 gms. of ethyl alcohol at 80° C. using 0.0242 gm. of benzoyl peroxide and 0.0164 gm. of azobisisobutyronitrile as catalyst. The polymer was then neutralized with NaOH and the solvent removed to obtain a 5 percent aqueous solution of the sodium salt of the interpolymer having a pH of 6-7 and a viscosity of 10,000 cps. (Brookfield).

EXAMPLE 7

In a similar manner an interpolymer of 18 gms. styrene (23 mole percent), 49.1 gms. methacrylic acid (75 mole percent) and 32.8 gms. of vinyl benzyl ether of nonyl phenol/40 EO (2 mole percent). The 5 percent sodium salt solution had a pH of 6-7 and a viscosity of 12,500 cps.

EXAMPLE 8

An interpolymer was prepared by polymerization of isobutylene (47.5 mole percent), maleic anhydride (50 mole percent) and a vinyl benzyl ether of nonyl phenol/40 EO (2.5 mole percent) in methyl ethyl ketone at 80° C. using azobisisobutyronitrile as catalyst. The polymer was isolated by devolatilization at 80° C. under vacuum and then made into a 5 percent sodium salt solution by neutralization with sodium hydroxide. The sodium salt solution had a viscosity of 5,400 cps. at pH 7.6.

EXAMPLE 9

An interpolymer was prepared similar to Example 8 except that the isobutylene was reduced to 22.5 mole percent and the omitted isobutylene was replaced by 25 mole percent of styrene. A 5 percent sodium salt solution was then made which had a viscosity of 7,200 cps. at pH 7.8.

EXAMPLE 10

Similar to Example 8, an interpolymer was prepared from 14.28 gms. styrene (42.8 mole percent), 15.83 gms. maleic anhydride (50.6 mole percent), 2.1 gms. itaconic acid (5.06 mole percent) and 11 gms. of vinyl benzyl ether nonyl phenol/40 EO (1.57 mole percent) by polymerization in methyl ethyl ketone at 90° C. for 5 hours with 0.0805 gm. of azobisisobutyronitrile as catalyst. A 10 percent sodium salt solution had a viscosity of 9,400 cps.

EXAMPLE 11

An interpolymer similar to Example 10 was prepared except that the amount of catalyst was cut in half. A 10 percent sodium salt solution had a viscosity of 19,480 cps.

EXAMPLE 12

Similar to Example 8 an interpolymer was prepared from 13.67 gms. (40.5 mole percent) styrene, 16.11 gms. maleic anhydride (50.5 mole percent), 2.1 gms. methacrylic acid (7.5 mole percent) and 11 gms. of VBE-9N40 (1.5 mole percent) by polymerization in methyl ethyl ketone at 90° C. for 5 hours with 0.08 gm. of azobisisobutyronitrile as catalyst. A 10 percent sodium salt solution had a viscosity of 10,290 cps.

EXAMPLE 13

An interpolymer similar to Example 12 was prepared except the amount of catalyst was cut in half. A 10 percent sodium salt solution had a viscosity of 19,480 cps.

EXAMPLE 14

Interpolymers similar to Example 12 were prepared in which the mole percents of styrene and methacrylic acid were varied with the proportions of other monomer held constant. In one case (A) the styrene content was 38.5 mole percent and methacrylic acid 10 mole percent. A 10 percent sodium salt solution had a viscosity of 21,500 cps. In the other case (B) the styrene content was 33.5 mole percent and methacrylic acid 15 mole percent. A 10 percent sodium salt solution had a viscosity of 13,600 cps.

EXAMPLE 15

Interpolymers for use in this invention may be prepared from various proportions of methyl methacrylate, acrylic acid and the vinyl benzyl ether monomer such as the ether of nonyl phenol/40 EO (VBE-9N40). The following interpolymers may be made.

WEIGHT PERCENTS

| Methyl methacrylate | Acrylic acid | VBE-9N40 |
|---|---|---|
| 10 | 80 | 10 |
| 10 | 70 | 20 |
| 10 | 60 | 30 |
| 20 | 70 | 10 |
| 20 | 60 | 20 |
| 20 | 50 | 30 |
| 30 | 60 | 10 |
| 30 | 50 | 20 |
| 30 | 40 | 30 |
| 40 | 50 | 10 |
| 40 | 40 | 20 |
| 50 | 40 | 10 |
| 50 | 30 | 20 |

EXAMPLE 16

The sodium salt solutions of the previous examples were used to thicken latexes similar to the acrylic latex B and polyvinyl latex D of Example 3 and evaluated for flow and leveling and other application properties. In all cases excellent properties were obtained or shown in the following tables.

ACRYLIC LATEX

| Thickener | Pounds per 100 gallons | Viscosity, Kreb units | Application properties | Flow and leveling [1] | Anti-sag index [2] |
|---|---|---|---|---|---|
| Example: | | | | | |
| 6 | 4 | 75 | Moderate | | 9— |
| 7 | 4 | 122 | Good | 9 | 11 |
| 8 | 4 | 140 | High | 8+ | 12 |
| 9 | 4 | 135 | ....do | 8+ | 12 |
| 10 | 4 | 102 | Good | 9 | 10 |
| 11 | 4 | 115 | ....do | 9 | 10+ |
| 12 | 4 | 104 | ....do | 9 | 10 |
| 13 | 4 | 116 | ....do | 9 | 10+ |

[1] 1-poor; 10-excellent.
[2] 3-complete sag; 12-no sag.

POLYVINYL ACETATE LATEX

| Thickener | Pounds per 100 gallons | Viscosity, Kreb units | Application properties | Flow and leveling [1] | Anti-sag index [2] |
|---|---|---|---|---|---|
| Example: | | | | | |
| 6 | 8 | 102 | Excellent | 9 | 11 |
| 7 | 6 | 108 | Good | 9 | 10 |
| 10 | 8 | 97 | ....do | 9 | 9+ |
| 11 | 8 | 106 | Moderate | 9 | 10 |
| 12 | 8 | 100 | Good | 9 | 10— |
| 13 | 8 | 104 | Excellent | 9 | 10+ |
| 8 | 8 | 114 | Moderate | 9 | 10— |
| 9 | 8 | 114 | ....do | 9 | 10— |
| 14A | 6 | 106 | Good | 9 | 10— |
| 14B | 8 | 106 | ....do | 9 | 10+ |

[1] 1-poor; 10-excellent.
[2] 3-complete sag; 12-no sag.

What is claimed is:

1. A thickened aqueous coating composition containing, as the essential film former, an emulsion of a water insoluble vinyl addition polymer, and thickening said composition by the addition thereto of a water or alkali soluble interpolymer of about 0.25 to 12.5 mole percent of a vinyl benzyl ether monomer, 25 to 99.75 mole percent of an anioinic or nonionic hydrophilic monomer and the balance to make 100 mole percent of a hydrophobic monomer wherein said vinyl benzyl ether has the formula

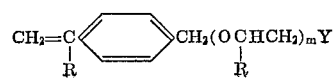

13 wherein R is hydrogen or methyl, $m$ is about 10 to 100 and Y is $$-OR_1, -SR_1, -NR_2, -O\overset{O}{\overset{\|}{C}}R_1, \text{ or } -N\overset{O}{\overset{\|}{C}}R_2$$
$$\qquad\qquad\quad\;\; |\qquad\qquad\; |$$
$$\qquad\qquad\quad\;\; R_3\qquad\qquad R_3$$

where $R_1$ is an alkyl, aralkyl or alkaryl hydrophobic group of 10 to about 12 carbon atoms, $R_2$ is an alkyl group of 1 to about 22 carbon atoms and $R_3$ is hydrogen or an alkyl group of 1 to about 22 carbon atoms, provided $R_2$ and $R_3$ in combination have at least 10 carbon atoms.

2. The composition of claim 1 wherein said hydrophilic monomer comprises from about 25 to 90 mole percent of said interpolymer.

3. The composition of claim 1 wherein said vinyl benzyl ether comprises from about 0.5 to 10 mole percent and said hydrophilic monomer comprises from about 40 to 80 mole percent of said interpolymer.

4. The composition of claim 1 wherein said hydrophobic monomer is an α-olefin, an alkenyl aromatic monomer, an alkyl ester of methacrylic or acrylic acid or mixtures thereof.

5. The composition of claim 4 wherein said hydrophilic monomer is an unsaturated monocarboxylic acid, an unsaturated dicarboxylic acid, an unsaturated dicarboxylic acid anhydride, an alkyl half ester of an unsaturated dicarboxylic acid or mixtures thereof.

6. The composition of claim 1 wherein said interpolymer has a molecular weight of about 30,000 to 600,000.

7. The composition of claim 1 wherein R in each instance is hydrogen and Y is $OR_1$.

8. The composition of claim 7 wherein $R_1$ is an alkylphenyl group.

9. The composition of claim 8 wherein $R_1$ is nonylphenyl.

10. The composition of claim 1 wherein $m$ is about 20 to 40.

11. The composition of claim 1 further containing therein a dispersed pigment up to a pigment volume concentration of about 65 percent.

12. A thickened aqueous coating composition containing, as the essential film former, an emulsion of a water insoluble vinyl addition polymer, and thickening said composition by the addition thereto of a water soluble salt of an interpolymer of an alkenyl aromatic monomer, an unsaturated dicarboxylic acid or anhydride thereof and a vinyl benzyl ether, wherein the mole ratio of said monomers ranges from 0.75/1/0.25 to 2.99/1/0.01, wherein said vinyl benzyl ether has the formula $$CH_2=C-\!\!\!\left\langle\;\;\right\rangle\!\!\!-CH_2\!\left(\!\!\begin{array}{c}OCHCH_2\\ |\\ R\end{array}\!\!\right)_{\!m}\!\!Y$$
$$\;\;\;\; |$$
$$\;\;\;\; R$$

wherein R is hydrogen or methyl, $m$ is about 10 to 100 and Y is $$-OR_1, -SR_1, -NR_2, -O\overset{O}{\overset{\|}{C}}R_1, \text{ or } -N\overset{O}{\overset{\|}{C}}R_2$$
$$\qquad\qquad\quad\;\; |\qquad\qquad\; |$$
$$\qquad\qquad\quad\;\; R_3\qquad\qquad R_3$$

where $R_1$ is an alkyl, aralkyl or alkaryl hydrophobic group of 10 to about 22 carbon atoms, $R_2$ is an alkyl group of 1 to about 22 carbon atoms and $R_3$ is hydrogen or an alkyl group of 1 to about 22 carbon atoms, provided $R_2$ and $R_3$ in combination have at least 10 carbon atoms.

13. The composition of claim 12 wherein the mole proportion of said acid or anhydride is about equal to the combined mole proportion of said aromatic and vinyl benzyl ether monomers.

14. The composition of claim 13 wherein said interpolymer is a copolymer of styrene, maleic anhydride and said vinyl benzyl ether.

15. The composition of claim 12 wherein R in each instance is hydrogen and Y is $OR_1$.

16. The composition of claim 15 wherein $R_1$ is an alkylphenyl group.

17. The composition of claim 16 wherein $R_1$ is nonylphenyl.

18. The composition of claim 12 wherein $m$ is about 20 to 40.

19. The composition of claim 12 wherein said interpolymer has a molecular weight of about 30,000 to 600,000.

20. The composition of claim 12 further containing therein a dispersed pigment up to a pigment volume concentration of about 65 percent.

21. A thickened aqueous coating composition containing, as the essential film former, an emulsion of a water insoluble vinyl addition polymer, and thickening said composition by the addition thereto of a water or alkali soluble interpolymer of about 0.25 to 12.5 mole percent of a vinyl benzyl ether monomer, 25 to 99.75 mole percent of an anionic or nonionic hydrophilic monomer and the balance to make 100 percent of a hydrophobic monomer wherein said vinyl benzyl ether has the formula $$CH_2=C-\!\!\!\left\langle\;\;\right\rangle\!\!\!-CH_2(OCH_2CH_2)_m OR_1$$
$$\;\;\;\; |$$
$$\;\;\;\; R$$

wherein R is hydrogen or methyl and $R_1$ is an alkyl, aralkyl or alkaryl group of 10 to about 22 carbons and $m$ is about 10 to 100.

22. The composition of claim 21 wherein said hydrophilic monomer comprises from about 25 to 90 mole percent of said interpolymer.

23. The composition of claim 21 wherein said vinyl benzyl ether comprises from about 0.5 to 10 mole percent and said hydrophilic monomer comprises from about 40 to 80 mole percent of said interpolymer.

24. The composition of claim 21 wherein said hydrophobic monomer is an α-olefin, an alkenyl aromatic monomer, an alkyl ester of methacrylic or acrylic acid or mixtures thereof.

25. The composition of claim 24 wherein said hydrophilic monomer is an unsaturated monocarboxylic acid, an unsaturated dicarboxylic acid, an unsaturated dicarboxylic acid anhydride, an alkyl half ester of an unsaturated dicarboxylic acid or mixtures thereof.

26. The composition of claim 21 wherein said hydrophobic monomer is an alkenyl aromatic monomer and said hydrophilic monomer is an unsaturated dicarboxylic acid or anhydride thereof and wherein the mole percent of said hydrophilic monomer comprises about 25 to 50 mole percent of said interpolymer.

27. The composition of claim 26 wherein the proportion of said hydrophilic monomer is about 50 mole percent of said interpolymer.

28. The composition of claim 26 wherein said interpolymer is a copolymer of styrene, maleic anhydride and said vinyl benzyl ether.

29. The composition of claim 26 wherein $R_1$ is an alkylphenyl group.

30. The composition of claim 29 wherein $R_1$ is nonylphenyl.

31. The composition of claim 26 wherein $m$ is about 20 to 40.

32. The composition of claim 26 wherein the interpolymer has a molecular weight of about 30,000 to 600,000.

33. The composition of claim 21 further containing therein a dispersed pigment up to a pigment volume concentration of about 65 percent.

References Cited

UNITED STATES PATENTS

| | | | |
|---|---|---|---|
| 3,708,445 | 1/1973 | Junas et al. | 260—4 R |
| 3,660,339 | 5/1972 | Schuh | 260—29.7 D |
| 3,499,876 | 3/1970 | Field et al. | 260—78.5 |
| 3,301,829 | 1/1967 | Woodward | 260—78.5 |
| 3,652,497 | 3/1972 | Junas et al. | 260—47 UA |
| 3,190,925 | 6/1965 | Stowe | 260—611 B |
| 3,100,804 | 8/1963 | Arbramo | 260—611 B |

WILLIAM H. SHORT, Primary Examiner

W. C. DANISON, Jr., Assistant Examiner

U.S. Cl. X.R.

260—29.6 TA, 29.6 E, 41 R, 78.5 BB, 478, 488 CD, 561 R, 584 B, 609 R, 611 B, 613 B, 901, 897 B, 874

PO-1050
(5/69)

UNITED STATES PATENT OFFICE
CERTIFICATE OF CORRECTION

Patent No. 3,794,608          Dated February 27, 1974

Inventor(s) Syamalarao Evani et al

It is certified that error appears in the above-identified patent and that said Letters Patent are hereby corrected as shown below:

Column 1, line 26, the word "Thi" should be --This--.

Column 5, line 54, the word "The" should be --This--.

Column 9, in the table, the last column under the heading "4th", second number down, the number "86" should be --76--.

Column 13, line 11, the number "12" should be --22--.

Signed and sealed this 10th day of September 1974.

(SEAL)
Attest:

McCOY M. GIBSON, JR.          C. MARSHALL DANN
Attesting Officer               Commissioner of Patents